United States Patent

Suga

[11] 3,889,531
[45] June 17, 1975

[54] WEATHERING TEST APPARATUS
[76] Inventor: Nagaichi Suga, No. 2, Toyamacho, Shinjuku-ku, Tokyo, Japan
[22] Filed: Apr. 5, 1974
[21] Appl. No.: 458,451

[52] U.S. Cl.............. 73/150 R; 126/270; 356/244; 356/256
[51] Int. Cl...................... G01n 17/00; G02b 27/32
[58] Field of Search............ 73/150 R, 159, 432 SD; 356/244, 173, 256; 126/270

[56] References Cited
UNITED STATES PATENTS

| | | | |
|---|---|---|---|
| 1,969,606 | 8/1934 | Hall | 73/150 |
| 2,945,417 | 7/1960 | Caryl et al. | 126/270 |
| 3,224,266 | 12/1965 | Klippert | 73/150 R |
| 3,521,966 | 7/1970 | Archer | 356/256 |
| 3,521,967 | 7/1970 | Archer | 356/256 |

Primary Examiner—Richard E. Aegerter
Assistant Examiner—Charles E. Phillips
Attorney, Agent, or Firm—Wenderoth, Lind & Ponack

[57] ABSTRACT

An improved weather test apparatus is disclosed. The basic structure includes a reflecting mirror support frame, reflecting mirrors mounted thereon for condensing sunlight towards a test piece, and a support member for positioning the test piece for receiving the condensed sunlight. The improvement specifically relates to a rotary test piece support member for use in conjunction with the basic structure. This member includes a pair of multi-sided end plates separated by a plurality of transverse members, one transverse member extending between each corresponding corner of the multi-sided end plates. A plurality of test piece adaptor plates are connected between the end plates, one adaptor plate being positioned parallel to each side of the multi-sided end plates. The adaptor plates, however, are separated from each other and air flow passages are thereby defined between adjacent adaptor plates. A plurality of air flow adjusting plates, one slidably mounted on each transverse member, is provided for adjusting the air flow through the rotary test piece support member. The rotary member is connected to the support member by a first shaft which is fixedly coupled to one of the end plates for rotating the test base support member and a second shaft, one end thereof being slidably coupled to and extending through the other of the end plates. The first shaft extends through the support member and is rotated by an appropriate drive chain while the second shaft is rigidly coupled to the support member. The second shaft is hollow, and the portion which extends into the rotary member is open. An air pump is coupled to the second shaft for circulating air therethrough into the rotary test piece support member and an arcuate wind direction plate is positioned within the test piece support member over the second shaft and downwardly extending thereabout.

4 Claims, 6 Drawing Figures

PATENTED JUN 17 1975　　　　　　　　　　　　　3,889,531

WEATHERING TEST APPARATUS

BACKGROUND OF THE INVENTION

1. Field of the Invention

The present invention relates to a condensor-type weathering test apparatus.

2. Description of the Prior Art

Heretofore, weathering tests have been conducted by means of a spontaneous weathering test apparatus having a fixed exposure stand facing towards the south at a predetermined inclination or by using an apparatus which follows the locus of the sun throughout the year to achieve maximum exposure. The latter device uses a control means such as a computer which may be contained in B of FIG. 1 in order to follow the sun's locus during the year. Sunlight, as shown in FIGS. 1 and 2, is reflected by a light-reflecting plate and is condensed on a face D. By means of this type of weathering test apparatus, the deterioration of test pieces may be accelerated.

However, the conventional test apparatus of the latter type has two major defects, both due to the fact that face D is continually illuminated by sunlight. The first difficulty is that, because the face D is shielded from above due to its configuration, the test piece face is not subject to rain, which is desirable for a determination of weathering effects. The second difficulty is that, even during the night hours, due to the condensing effect of the apparatus, the test piece is always illuminated by a light which is practically as strong as natural daylight. It is, in fact, often necessary that the illuminating light be, even during the daylight hours, no stronger than light corresponding to the received light during the night hours.

SUMMARY OF THE INVENTION

The present invention overcomes the prior art defects by the use of a test piece support member having four faces and which is rotated either continuously or intermittently, by appropriately provided means, whereby the test piece is not always subjected to condensed light and which will also be subjected to the weathering action of rain.

DETAILED DESCRIPTION OF THE PREFERRED EMBODIMENT

Figure 1:
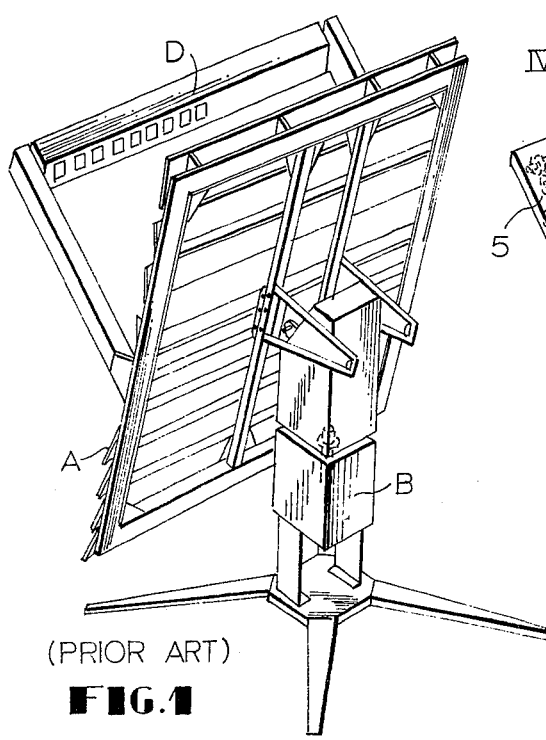
FIG. 1 shows a conventional weathering apparatus which follows the sun.
Figure 3:
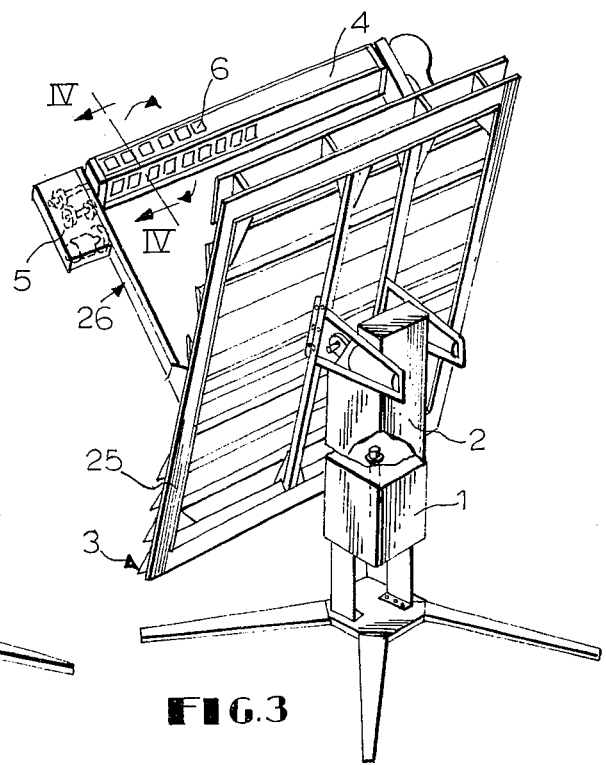
FIG. 3 is a perspective view of an embodiment of the subject invention.
Figure 2:
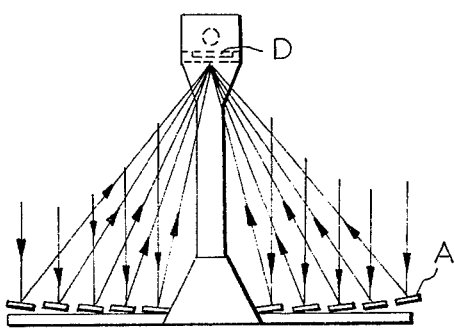
FIG. 2 is a view taken along a plane parallel to the plane of the reflectors A for showing the relation between the reflecting mirrors and the test piece support D.

Referring now to FIG. 3, reference numerals 1 and 2 collectively indicate a means for orientation and attitude control of the weathering test apparatus whereby the apparatus may follow the sun. The rotating means is governed by a computer which is contained within the member 1. Reflecting mirrors 3 are positioned on a support frame 25 in a manner to condense sunlight onto a test piece 6. A rotary test piece support member 4 is mounted a fixed distance from the reflecting mirrors. The test piece 6 is mounted on the rotary test piece support member 4 as shwon and the controls for rotation thereof are located within housing 5.

Figure 4:
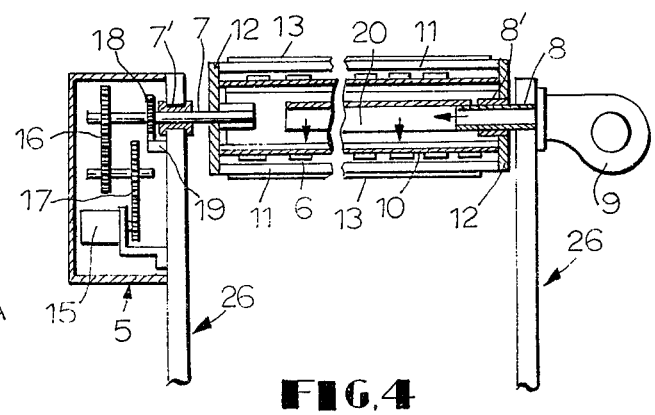
FIG. 4 is a sectional view of the rotary test piece support member 4 and associated structure of FIG. 3.
Figure 6:
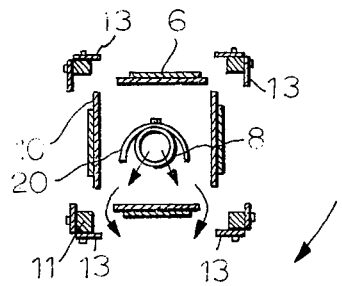
FIG. 6 discloses a longitudinal sectional view of the rotary test piece support member.
Figure 5:
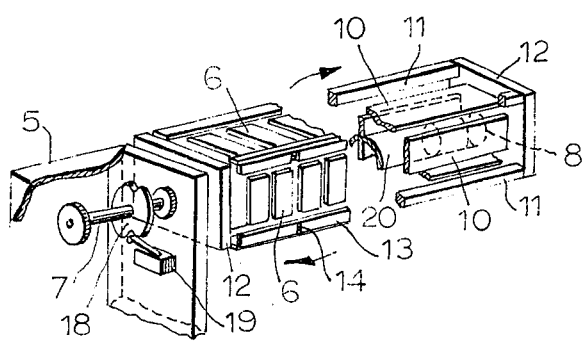
FIG. 5 discloses an enlarged perspective view of the rotary test piece support member of FIG. 3 partially in section.

Now referring to FIGS. 5 and 6, the rotary test piece support member has a pair of square side plates 12 in parallel relationship with a transverse member 11 extending between each of the respective corners of the two square side plates 12; the side plates 12 being rigidily connected thereby. Four test piece-adaptor plates 10 are mounted between the side plates 12, one plate 10 parallel to each side of the plate 12. Adjacent plates 10 are separated so that air can smoothly pass through the region defined between the adaptor plates 10. Each test piece 6 is attached by means of a screw or other suitable fitting to the outer face of the adaptor plates as shown. An airflow adjusting plate 13 is attached to the outer portion of each of the four transverse members 11. The adjusting plate 13 has a slot 14 through which a pin can be inserted for adjustment of the plate 13. The rotary test piece support member 4 is mounted, as shown in FIG. 4, on shafts 7 and 8, respectively. The shaft 8 is fixedly connected to frame 26 of the test apparatus and extends through one side plate 12 and is rotatably coupled thereto by means of bearing 8', which is positioned in a bearing hole in the side plate 12. The shaft 8 is, in this embodiment, hollow and opens within the interior of the rotary test piece support member 4 and serves as a blast guide pipe for an air blower 9 which is used for cooling the test piece 6. Rotatable shaft 7 extends through and is fixedly engaged by the left-hand side plate 12 as shown. The shafts 7 and 8 are, preferably, in axial alignment. The shaft 7 is rotatably supported by a bearing 7' in the frame 26 of the apparatus and extends therethrough into the housing 5. The rotating shaft 7 is driven by a motor 15 through gears 16 and 17, as shown. A cam 18 is mounted on the shaft 7 in engageable relationship to microswitch 19. A wind direction plate 20 is mounted above the blast guide pipe 8 for causing a downward flow of the air so it will travel along the lower portion of the condensing face as shown by the arrows in FIGS. 4–6.

A device embodying the subject invention may rotate either continuously or intermittently. If the device is to be rotated intermittently, electrical signals are provided at periodic intervals by a timer (not shown). The motor 15 is coupled to the electric timer and is activated thereby, and is deactivated shortly thereafter by means of the cam 18 and the microswitch 19. The cam is adjusted prior to operation in order to allow the rotary test piece support member 4 to rotate approximately 90° about its longitudinal axis before the motor is deactivated. In the case where continuous rotation is desired, the motor is directly actuated and continuously rotates. A changeover switch (not shown) may be provided for switching from continuous to intermittent operation.

Once the weathering test apparatus is in operation, the rotary test piece support member is rotated about its longitudinal axis during the course of the test. When the test piece is facing the reflecting mirror, it is strongly illuminated by light. When it is rotated by approximately 90° (that is, when the next successive row of test pieces is positioned for receiving maximum light) it assumes a position perpendicular to the plane of the reflecting mirrors and receives only comparatively weak light which is scattered from the sky, etc. When subsequently rotated, the test piece is positioned facing the sun (and thus is subject to the affect of rain). The fourth rotational position is approximately equivalent to that of the second position. This system, then, provides an improved means whereby both the weather-resistant and light-resistant characteristics of the test piece may be determined.

The blast guide pipe 8, the wind direction plate 20 and the airflow adjusting plates 13 are provided in order to protect the test piece face from increased temperatures due to the condensed light rays.

In summary, the subject invention has the following new and improved characteristics: The test piece can be exposed to rain during the testing process and the intensity of the light is increased by means of the condensing mirrors but the test piece is not necessarily confined to full time exposure to bright light and may receive varied amounts of light due to the rotational characteristics of the support member. Any error in the condensing of light due to mispositioning of the reflecting mirror on the face of the apparatus can be compensated for by appropriately rotating the test piece support member. The undesirable and abnormal deterioration of test pieces due to increased temperatures can be prevented by the combined effect of rotation and by the air which is blown therethrough. Finally, the four faces can hold four times as many samples as the conventional device which has only one useful face.

The efficacy of the subject invention may be appreciated by considering the following experimental results. The test results using a conventional device disclosed a difference between the front and back of a dyed cloth due to the uneven distribution of light, specifically the front portion was at Grade 4 while the back portion was at Grade 3. In contrast, both front and back portions were at Grade 4 in systems B and C, as shown. The "grade" is the grade of light fastness on the blue scale, shown in the Standard JIS-L 0841–1966 of the test method for determining color fastness in daylight.

Table 1 discloses the direction of color change and fading for various dyed material, wherein test system A used a conventional condenser type device having one fixed face. The results obtained by the use of the subject invention is listed as system B. Results obtained by means of a spontaneous weathering test apparatus are tabulated as C.

Table 1

| | Direction of color change and fading | | |
|---|---|---|---|
| | Blue | Red | Yellow |
| System C | Blackness Grade 4 | Fading Grade 3 | Whiteness Grade 6 |
| System A | Whiteness Grade 3 | Blackness Grade 3 | Redness Grade 5 |
| System B | Blackness Grade 4 | Fading Grade 5 | Whiteness Grade 5 to 6 |
| Material | wool serge | viscose rayon | viscose rayon |
| Dye | Japanol (brand name) Brilliant Blue 6B KX | Suminol (brand name) Leveling Brilliant Red $S_3B$ | Suminol (brand name) Fast yellow 2GP |

(The test-pieces are tested under the condition of no rainfall)

Table 2

| System | Paint or such which may be affected by exposure to rain | | | |
|---|---|---|---|---|
| | Deterioration | Primary color (Y value) | After deterioration | Brilliance |
| C | 1 year | 50 % | 20 % | 40 – 10 % |
| A | 1 month | 50 % | 10 % | 40 – 5 % |
| B | 1.5 month | 50 % | 22 % | 40 – 10 % |
| Test-piece name | | NDS XK 6305B Phthalate resin Semi-gloss | | |
| C | 1 year | 45 % | 20 % | 50 – 30 % |
| A | 1 month | 45 % | 5 % | 50 – 51 % |
| B | 1.7 month | 45 % | 22 % | 50 – 35 % |
| Test-piece name | | Mil. E-10687B Enamel Lusterless Quick Drying | | |
| C | 1 year | 60 % | 40 % | 40 – 10 % |
| A | 0.9 month | 60 % | 50 % | 40 – 5 % |
| B | 1 month | 60 % | 40 % | 40 – 10 % |
| Test-piece name | | Phthalate resin Enamel | | |

Table 2 discloses the deterioration of paint and other material which is subjected to rain.

It should, therefore, be apparent that Applicant has achieved superior results by means of the improved test apparatus incorporating a rotary test piece support member. It should be noted that there are many modifications to the subject invention which will be apparent to one of ordinary skill in the art when reading the subject disclosure and these are to be, of course, considered within the scope of the invention.

What is claimed is:

1. An improved weather test apparatus including a reflecting mirror support frame, reflecting mirrors mounted thereon for condensing sunlight toward a test piece, and a support member for positioning the test piece for receiving the condensed sunlight thereupon, wherein the improvement comprises:

a rotary test piece support member comprised of a pair of multisided end plates, a plurality of transverse members, each connecting a respective corner of said end plates for rigid separation thereof, a plurality of test piece adaptor plates connected between said end plates at locations corresponding to each of the sides of said end plates and having test pieces supported thereon, said test piece adaptor plates defining air flow passages between adjacent adaptor plates, a plurality of air flow adjusting plates, at least one mounted on each of said transverse members for slidable movement laterally of said transverse member, a first shaft fixedly coupled to one of said end plates, said first shaft adapted for rotating said test piece support member, a second shaft, one end thereof being slidably coupled to and extending through the other of said end plates into the interior of the said rotary test piece support member and the other end being rigidly mounted to said support member, said second shaft being hollow and said one end being open within the interior of said test piece support member, and an arcuate wind direction plate positioned over said second shaft and downwardly extending thereabout;

means for rotating said first shaft, operatively coupled thereto and to said support member, and air blowing means coupled to said second shaft.

2. The device of claim 1 wherein said means for rotating said first shaft operates continuously and intermittently according to the affects desired.

3. The device of claim 2 wherein said end plates are square, four transverse members are provided, each having a square cross-section and a bearing positioned centrally of one of said end plates through which said second shaft extends.

4. The device of claim 3 wherein said means for rotating said first shaft is positioned on said support member opposite the location of said rotary test piece support member, said frame member having an aperture therein, a bearing positioned in said aperture and said first shaft extending therethrough and being coupled to said means for rotating said first shaft.

* * * * *